May 31, 1938.  W. C. O'LEARY  2,119,438
VACUUM WALL RECEPTACLE
Original Filed Nov. 28, 1933
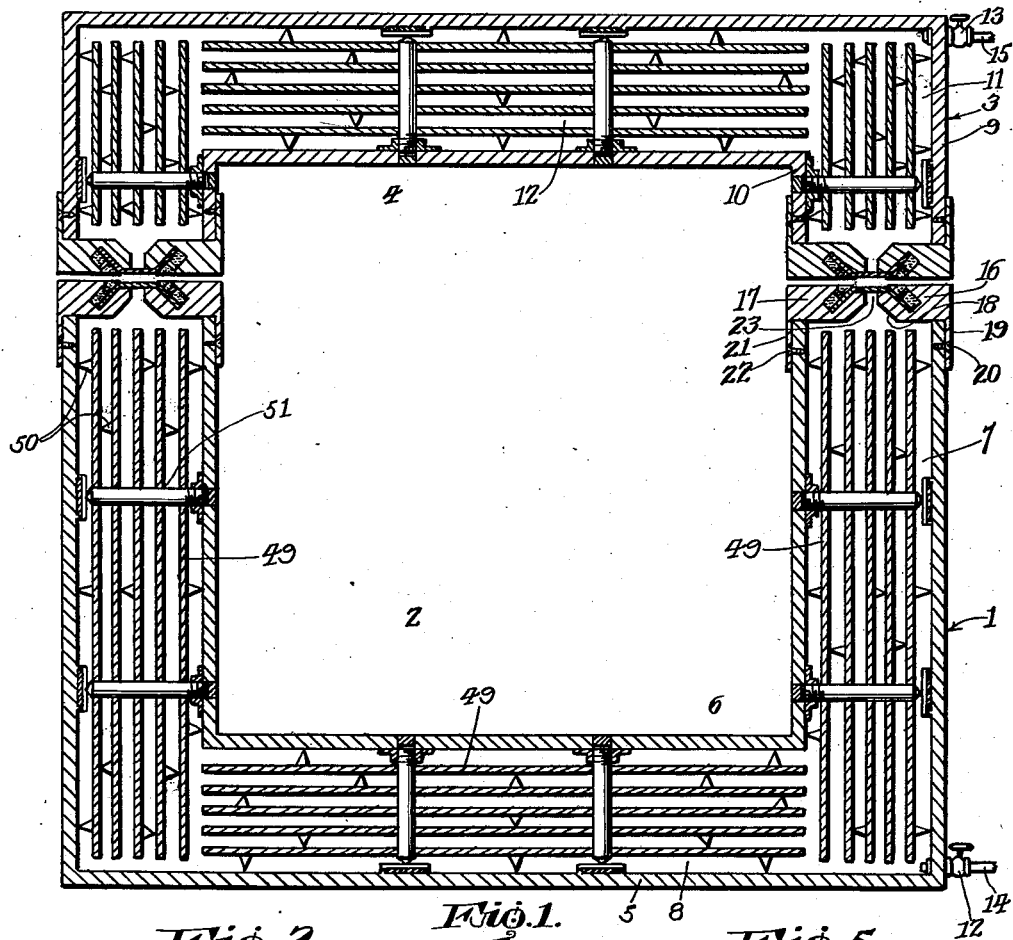
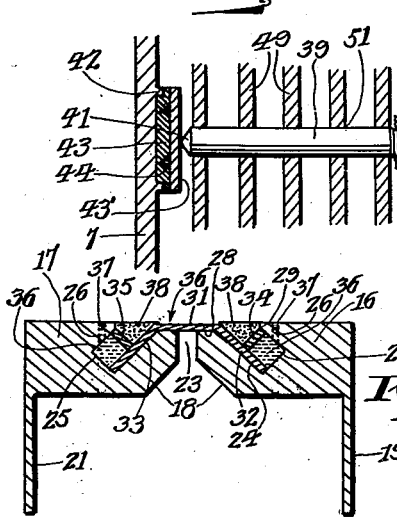
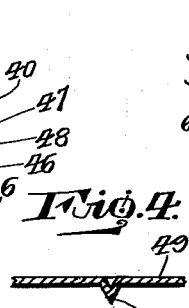
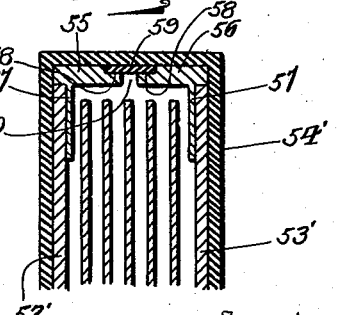
Inventor
William C. O'leary
By Geo. P. Kimmel
Attorney Patented May 31, 1938

2,119,438

UNITED STATES PATENT OFFICE 2,119,438

VACUUM WALL RECEPTACLE

William C. O'Leary, Washington, D. C.

Application November 28, 1933, Serial No. 700,143
Renewed May 12, 1937

15 Claims. (Cl. 220—9)

This invention relates to a vacuum wall receptacle and has for its object to provide, in a manner as hereinafter set forth, a receptacle of such class constructed and arranged to obtain a substantially perfect insulation from heat. It is understood that the structure can be used to exclude or retain heat and that it can be made of any size or shape and adapted to any purpose requiring the use of a vacuum wall insulation.

The receptacle is an improvement upon that disclosed in my application filed Oct. 7, 1930, renewed September 18, 1931, Serial Number 168,-102 and changes nothing fundamental with respect to the invention disclosed in the application referred to, but adds important and useful mechanical details. The primary feature of this structure is a hollow wall surrounding an open top chamber and open at its edge, eliminating the standard edge joint in universal use. This necessitates an intra-wall bracing structure to brace the walls and rigidly fix the walls in position. A heat insulating body suspended in the hollow space has holes for the passage of the bracing rods. The edge joint is replaced by a flange structure providing a narrow open edge and supporting a sealing strip of very low heat conductivity for closing and sealing the narrow open edge. With these elements in place the hollow wall can be vacuumized and will provide substantially perfect heat insulation and the details added by the present revision will carry the work a little nearer the absolute. The sealing strip provides an edge heat insulation and it must be soft or minutely thin. It can be made of rubber cloth, steel or glass or any material resistant to air penetration and air pressure. Pure rubber may be used if mounted on minutely thin material. A rubber cloth sealing strip needs only to be comparatively thin, but if steel or glass is used the septum must be minutely thin, 1/500 of an inch in thickness or less. I call that part of the sealing strip closing the narrow open edge, the septum. No matter what material is used the sealing element will be as thin as it can be made and be impenetrable to air. Because of this the mechanical conveyance of heat is reduced to a minimum. In experimental models used by me, the narrow edge opening was designed for 1/20 of an inch, but 1/10 of an inch was used. The structure can easily be made sufficiently rigid to permit the use of an opening 1/40 of an inch wide. The air pressure on a septum of this width is only 3/8 of a pound to the inch. Crossing the narrow open edge is a very shallow depression in the flanges. This depression is somewhat narrow and from its bottom on each side at the corner of the depression extends downward and outward a deep groove. The sealing strip extends into this groove on each side of the narrow open edge and is fastened therein by a continuous strip of hard material pressing said sealing strip against the bottom side of the groove and extending across the groove to the upper wall of said groove. Above this strip which is somewhat below the orifice of the groove is solid sealing material, and below said strip in the groove is a continuous hollow space. This hollow space is filled by an inert liquid such as glycerine or linseed oil. This liquid is siphoned into the hollow space and the air driven out therefrom by suitable vents near corners of the flanges. When the hollow space is filled with liquid the vents are plugged. This arrangement of elements provides a compound solid and liquid seal for the sealing strip and no air can pass through said compound seal. White lead can be used in place of the liquid. If white lead is used, the vents hereinbefore described are unnecessary. The white lead can be placed in the hollow and the strip before described placed over the white lead. If rubber cloth is used for the sealing strip, it will substantially fill the shallow depression in the flange structure and be in light contact with the sealing strip in the wall of the cover, said cover being of a construction like to that of the base, but shorter in height. If steel or glass is used for the sealing strip there will be a minute air space—an extensive air space at this point would impair the work of the structure. Air is matter and conveys heat mechanically. I will assume for convenience that the opposed walls enclosing the vacuum space are of steel 1/8 of an inch in thickness; the flange 1/4 inch thick, the vacuum space 2 inches wide, the enclosed chamber 2 feet by 2 by 2. Each of the flange elements is made separately. A vertical band 1/16 of an inch in thickness extends from the base of the flange at its edge. This band fits accurately the outer face of the wall, referring to the relation of said wall to the vacuum space. The flange itself seats on the top edge of the wall. The band can be tightly fastened to the wall by short screws and all joints suitably sealed. The steel walls are electroplated with tin or nickel to make them impenetrable to air. The bracing structure consists of rods attached to the inner wall and making a pressure contact with the opposing wall. About six rods to the square foot will be enough but more can be used if necessary. Each rod is threaded at its head and fits a threaded sleeve attached to the inner wall and makes firm contact with the opposing wall providing resistance to air pressure and rigidity for the structure. The threaded sleeve has an expanded base which is welded to the wall within the hollow space and the tubular hollow in the sleeve is a continuation of the hole in the wall made for the passage of the bracing rod. The hole in the wall itself is not threaded and when the bracing rod is screwed home, said bracing rod having a hard minute point for contact with the opposing wall, the head of said bracing rod is countersunk ⅛ of an inch and this space is filled by an accurately fitting steel plug, the joint being suitably sealed. Opposed to the minute point of the bracing rod is a hard metal plate, said plate being supplied with minute spikes on its base for sticking into a pad of soft material embedded in a shallow socket attached to the wall, said pad covering the edges as well as the bottom of the socket. This pad breaks the continuity of metallic contact. If, in a special model, the bracing rods were equipped with diamond chip points, it would reduce contact to the very lowest point that is possible. The heat insulating body suspended in the vacuum space consists of thin, stiff sheets of silver colored metal slightly spaced from each other and from the surrounding wall. These sheets extend approximately the length and breadth of the vacuum space. The outer surface of each sheet has a mirrorlike polish and the inner surface is a dull black. The spaces are preferably of a width of ⅛ of an inch, but could be made narrower or wider. The spacing elements are cones having a somewhat sharp point, said cones being embossed in the sheets. The smallest number of cones necessary will be used and they will be systematically distributed to do the work. Instead of the cones ⅛ inch radio tacks can be used. Paper cones having a slightly expanded flat base could be glued to the sheets. The point of the cone contacts the opposite sheet. In place of the metallic mirrors, while cardboard can be used, said white cardboard is lustrous on its outer surface. An all steel wall can be made for this invention. The sealing strip of minutely thin steel can be welded in the depression crossing the narrow open edge between the flanges. The structure can be made of seamless glass by like means. The glass sleeve for the bracing rod should be of somewhat thick glass, the hollow wider at its beginning and slightly tapering inwardly. The glass sleeve is threaded with side, coarse threads. A metal sleeve screws into the glass sleeve until it is tightly fixed. The interior of the metal sleeve is a simple, threaded cylinder, to which the bracing rod is threaded at the inner end of said bracing rod, the point making contact with the opposite wall. The metal sleeve and rod are countersunk and the space is filled with an accurately fitting glass plug which is welded to the glass wall producing a seamless glass wall. A small pressure gauge can be affixed, adequately sealed, in the outer wall of this structure in each of the forms of said structure. An inconspicuous exhaust valve is supplied for the base and also for the cover. This valve is to be of special construction not here disclosed. This is a simple vacuum wall receptacle designed to establish perfection of heat insulation as nearly as possible and no drainage tube is shown, but one can be supplied when the receptacle is used for ice storage. This structure as herein designed can be made of comparatively thick hard wood or thin sheet iron. In that case, the narrow open edge between the flanges is closed with a thin strip of any suitable material tightly stretched across said open edge. This is not a sealing strip, but only a closing element. This form of the structure is porous and penetrable to air. To make it impenetrable, it is completely encased in a closely fitting envelope of pure rubber. The rubber is packed against the hard porous wall by air pressure and becomes more dense and impenetrable than normal. If a thin steel wall is used instead of the porous wall, the rubber envelope is cemented to the steel wall. The rubber envelope is painted over and varnished and the rubber is not in contact with air and will not be subject to oxidization. For thin wall or wooden walls it may be necessary to provide metal bands around the walls and across the bottom. The same effect may be attained by increasing the area of the spaced plates and the area of the flat expanded bases of the threaded sleeves. Rigidity is essential to this structure as the sealing element of this vacuum wall is an edge insulation, either soft or thin and has no structural strength but must be supported. In a comparatively small receptacle, round in shape, only a few bracing rods are needed and they can be placed where it is most convenient for fixing the walls rigidly in position. An absolutely permanent vacuum may be retained in the vacuum wall by connecting the pressure gauge indicator with an electrically controlled vacuum pump; but I think this will be unnecessary and that an occasional hand pumping will suffice. There can be no doubt that a large receptacle made as hereinabove designed will keep a block of ice for a period of time indefinitely extended.

To the above ends essentially and to others which may hereinafter appear, the invention consists of such parts, and such combination of parts which fall within the scope of the invention as claimed.

The drawing illustrates by way of example two embodiments of the invention.

In the drawing:

Figure 1 is a vertical sectional view of a vacuum wall receptacle, in accordance with this invention, and of a type including an open top container part and a cover part for the latter.

Figure 2 is a fragmentary view in vertical section of a wall of the receptacle.

Figure 3 is a cross sectional view illustrating the form of the combined edge and closure for the walls of the container section.

Figure 4 is a fragmentary sectional view showing the form of heat absorbers employed.

Figure 5 is a fragmentary view in vertical section of a modified form of receptacle.

With reference to Figures 1 to 4 of the drawing, the receptacle as shown includes an open top container part 1 of U-shape contour in transverse and horizontal section and which provides an open top storage chamber 2 and mounted upon the part 1 is a closure or lid part 3, of inverted U-shape contour in transverse and horizontal section which when mounted in position forms a continuation 4 of and closes the open top of part 2.

The part 1 includes a pair of sections 5, 6 of like form, the latter being arranged within, spaced from and having its top aligning with the top of the section 5. Each section includes a bottom and four upstanding sides arranged in pairs and with the sides of each pair opposing each other. The arrangement referred to provides hollow side walls 7 open at their top edges and a hollow bottom 8 opening into the side walls. The hollow side walls are closed at their top edges in a manner to be referred to and the air to be exhausted therefrom and from the hollow bottom to provide a vacuum wall which entirely surrounds the chamber 2.

The part 3 includes a pair of sections 9, 10 of like form, the latter being arranged within, spaced from and having its top aligning with the top of the section 10. Each section includes a top and four depending sides arranged in pairs and with the sides of each pair opposing each other. The arrangement just referred to provides hollow side walls 11 open at their bottom edges and a hollow bottom 12 opening into said walls. The hollow side walls are closed at their bottom edges in a manner to be referred to and when the air is exhausted therefrom and from the hollow bottom there is provided a vacuum wall which entirely surrounds the continuation 4 of chamber 2.

The sides of section 5 align with the sides of section 9. The sides of section 6 align with the sides of section 10. The container part 1 and cover part 3 have opening thereinto normally closed valves 12, 13 respectively which are adapted to have connected thereto sections 14, 15 respectively for exhausting air from the hollow walls of the sections.

Associated with the open top edges of the walls of section 1 is a closure means therefor consisting of a pair of oppositely disposed, opposed spaced flanged frames 16, 17, the former seating on the top edge of section 5 and extending inwardly therefrom and the latter seating on the top edge of section 6 and extending towards frame 16. The lower inner corners of each frame are beveled, as at 18. The outer side of frame 16 has a depending flange 19 which bears against the outer face of section 5 and is anchored to the latter by holdfast means 20. The frame 17 has a depending flange 21 which bears against the rear face of section 6 and is anchored to the latter by holdfast devices 22. The frames 16, 17 are positioned in a manner relative to each other to provide a narrow space 23 therebetween.

Each frame is formed with an inclined groove 24 opening at the upper face thereof in proximity to its side edge. The end wall 25 of the groove extends at an inclination towards the front edge of the frame, and the latter has vertical ports 26 which open at one end into the groove. The side of the upper face of the frame is rabbeted to provide a seat 28 for a purpose to be referred to. The upper side wall of the groove has a straight outer part 29.

A thin closure 30 is provided for the space 23 and which is formed with a flat intermediate portion 31 and a pair of oppositely inclined depending outer portions 32, 33. The portion 31 is mounted upon the seats 28. The portion 32 is seated against and throughout the lower side wall of the grove 24 in frame 16. The portion 33 is seated against and throughout the lower side wall of the groove in frame 17. Anchoring means 34, 35 are provided for the portions 32, 33 respectively and which consists of relatively thin strips 32 interposed between said portions 32, 33 and the upper side walls of the grooves. The air is exhausted from the spaces formed between the anchoring strips and end walls of the grooves by forcing a filler 36, such as glycerine into said grooves and the air driven by the latter through the ports 26. After the grooves are filled with the liquid and the air driven out from the grooves, the ports 26 are plugged as at 37. The grooves above the anchoring strips and their outer ends are closed by a suitable filler 38. The arrangement referred to provides for anchoring the closure 30 to the frame and for providing an air tight joint.

Spaced intra-wall bracing structures are provided for bracing the sides and the bottoms of the sections 1 and 3 relatively to each other. Each of said structures includes an adjustable bracing rod or member 39 of cylindrical cross section formed with peripheral threads 40 at one end and a point 41 at its other end; a squared socket forming member 42 integral with the inner face of section 1; a cushioning pad 43 mounted in and overlapping the edge of member 42; a squared abutment plate 43' seated against and formed with fastening bars 44 therefor anchored in pad 43; the point 41 bearing against plate 43; a flared interiorly threaded collar 45. The flange of the latter is indicated at 46 and is secured to that face of section 3 opposing that face of section 5. The threads of the bracing member 39 engage with the threads of collar 45 whereby member 39 is coupled with section 3 and exerts a bracing pressure from section 6 on section 5 through plate 44, pad 43 and member 42. The section 6 is formed with an opening 47 for the passage of a suitable tool to adjust member 39. A removable plug 48 is provided for opening 48. The bracing members of the intra-wall bracing structures provide retainers for heat insulating elements to be presently referred to.

Arranged in each hollow wall and the hollow bottom of container part 1 is a set of spaced heat insulating elements 49. Each set is spaced from sections 5 and 6 of part 1 and from each other. Each element 49 is of sheet or platelike form provided with pointed laterally disposed embossed cones 50 constituting spacers functioning to maintain the set in spaced relation with respect to sections 5 and 6 and the elements 49 of the set in spaced relation with respect to each other. The element 49 of said sets have sets of aligning openings 51 for the passage of the bracing members 39 of the intra-wall bracing structures. The members 39 prevent the elements of each set from shifting relatively to each other. The elements of each set are formed of material as hereinafter referred to.

Associated with the open lower edges of the walls of the cover or lid part 3 is a closure means 52 of the same form and arrangement as the closure means employed in connection with container part 1. Positioned between the sections 9, 10 of part 3 are spaced intra-wall bracing structures 53 of the same form and arangement as the intra-wall bracing structures employed in connection with container part 1. Arranged with the hollow walls and hollow top of cover or lid part 3 are sets of heat absorbing elements 54 of the same form and arrangement as the sets of heat absorbing elements used in connection with container part 1.

The function and form of the element acting to close the passage between a pair of frames is heretofore referred to. This statement also applies to the elements 49, as well as the intra-wall bracing structures. The sections of parts 1 and 3 are formed of material non-penetrable by air, preferably steel.

In the modified form shown in Figure 5, the sections of the container part or cover part, indicated at 52', 53' are to be formed of wood or other material pervious to air and enclosed by an impervious rubber covering 54'. The closing means for the open edge of container or lid part will consist of a pair of oppositely disposed frames 55, 55 seated on and provided with flanges 57 which are anchored to the sections. The frames will be rabbeted to provide seats 58, to which a closure 59 for the passage 60 between the frames is anchored. The covering 54' extends across the frame and bears on closure 59.

What I claim is:—

1. In a vacuum wall receptacle, an open top chamber surrounded by a hollow space having opposed walls and open at its edge, bracing rods affixed to one of said walls and making pressure contact with the other for fixing said opposed walls rigidly in position, a heat insulating body arranged in said hollow space and having holes for the passage of said bracing rods, a flange structure providing a continuous narrow open edge for said hollow space and a sealing strip of very low heat conductivity for closing said narrow open edge, the central part of said sealing strip seated in a continuous shallow depression crossing said open edge and the side parts of said sealing strip extending into continuous grooves on each side of said central depression, said grooves extending obliquely downward and outward in said flanges, a sealing element within said grooves for binding and sealing said sealing strip, said hollow space when exhausted of air becoming a vacuum space having opposed walls, said opposed walls forming a vacuum wall surrounding said open top chamber.

2. In a vacuum wall receptacle, an open top chamber surrounded by a hollow space having opposed walls and open at its edge, bracing rods affixed to one of said walls and making pressure contact with the other for fixing said opposed walls rigidly in position, a heat insulation body suspended in said hollow space and having holes for the passage of said bracing rods, a flange structure providing a continuous narrow open edge for said hollow space and a sealing strip of very low heat conductivity for closing said open edge, the control part of said sealing strip resting in a continuous shallow depression in said flanges and crossing said narrow open edge and the side parts of said sealing strip extending into continuous grooves in said flanges on each side of said shallow depression, a sealing element in each of said grooves, said element comprising a solid sealing material above a binding strip and a liquid element below said binding strip, thus providing a compound solid and liquid seal for said sealing strip, said hollow space when exhausted of air becoming a vacuum space having opposed walls, said opposed walls forming a vacuum wall surrounding said open top chamber.

3. In a vacuum wall receptacle, means to provide a vacuum space having opposed walls and surrounding an open top chamber, said vacuum space closed and sealed at its edge and having edge heat insulation, bracing rods crossing said vacuum space, a heat insulating body within said space, said body having holes for the passage of said bracing rods, each of said bracing rods threaded at its inner end to a threaded sleeve, said sleeve being attached by an expanded flat base to the face of the inner wall, the threaded hollow in said sleeve being a continuation of the hole in the wall made for the passage of the bracing rod, said bracing rod having a hard minute point for contact with a metal plate attached to the opposed wall, said metal plate affixed to a soft pad, said pad being compressed into a shallow socket attached to the wall and covering the edges of said socket as well as the bottom thereof, said bracing rod and threaded sleeve being countersunk in the inner wall to the extent of the thickness of the wall making a hollow filled by an accurately fitting sealed plug.

4. In a vacuum wall receptacle, means to provide an open top chamber surrounded by a vacuum space having opposed glass walls, said vacuum space sealed by a flange structure providing a very narrow and minutely thin continuous seal of glass supported within a continuous shallow depression in said flange structure and welded to said flange structure, bracing rods for fixing said walls in rigid position, each of said bracing rods threaded at its inner end to a threaded sleeve attached to the inner wall and making contact at a minute point with the outer wall, said threaded sleeve being made of a somewhat thick glass sleeve having a hollow tapering slightly inwardly and having wide, coarse, threads, a metal sleeve fitted tightly on its outer surface to said threads, said metal sleeve enclosing a cylindrical threaded hollow engaging the threaded inner end of said bracing rod, said metal sleeve and rod being countersunk in said glass sleeve providing a hollow accurately fitted with a glass plug, said plug being welded to the glass wall making a seamless glass wall having a minutely thin glass edge heat insulation and enclosing a vacuum space surrounding an open top chamber.

5. In a vacuum wall receptacle, an open top chamber surrounded by a hollow space open at its edge, a sealing means for said hollow space comprising a thin sealing strip of very low conductivity supported upon flanges and closing a very narrow continuous open edge, said sealing strip being sealed in grooves in said flanges, said grooves containing a compound solid and liquid sealing element, bracing rods crossing said hollow space, said bracing rods attached to the inner wall and making contact with the outer wall, a heat insulating body arranged within said space and having holes for the passage of said bracing rods, said heat insulating body consisting of thin, stiff sheets of silver colored metal slightly spaced from each other and from the walls, said sheets extending approximately the length and breadth of the hollow space, each of said sheets having a mirrorlike polish on its outer surface and a dull black surface inwardly, each of said sheets having enclosed cones forming spacing elements, said hollow space when exhausted of air becoming a vacuum space having opposed walls, said opposed walls forming a vacuum wall surrounding said open top chamber.

6. In a vacuum wall receptacle, an open top chamber surrounded by a hollow space having opposed walls and open at its edge, bracing rods systematically distributed through said hollow space, said bracing rods attached to one of said walls and making minute contact with the opposite wall for resisting air pressure and for fixing said opposed walls rigidly in position, flanges extending inwardly toward the median line forming a very narrow open edge for said hollow space, a thin structure mounted on said flanges and closing said hollow space, a soft element, impenetrable to air supported on said flanges and said thin closing element, said soft element making an edge heat insulating means for said hollow wall, said soft element sealed to a closely fitting envelope impenetrable to air, said envelope completely enclosing said opposed walls, said hollow space when exhausted of air becoming a vacuum space having opposed walls, said walls forming a vacuum wall surrounding an open top chamber.

7. In a vacuum wall receptacle, an open top chamber surrounded by a hollow space open at its edge, bracing rods crossing said hollow space, said rods being attached to one of said opposed walls and making firm contact with the other wall, a heat insulating body arranged in said hollow space free of contact with the walls and having holes for the passage of said bracing rods, means for reducing the width of the open edge of said hollow space providing a continuous narrow open edge for said space, a shallow depression crossing said narrow open edge, grooves extending from each corner of said shallow depression, a sealing strip of very low heat conductivity seated in said depression closing and sealing said narrow open edge, said sealing strip extending into said grooves on each side and there fastened by solid sealing material, a binding strip and a liquid, said liquid enclosed in the space in each of said grooves below said binding strip providing a compound double seal for said sealing strip, and a cover for said open top chamber, said cover of like construction and means to said open top chamber but shorter in height, the vacuum wall surrounding the central space in said cover being a continuation of the vacuum wall surrounding said open top chamber, each of these elements being sealed at its edge and having edge heat insulation, providing continuous heat insulation surrounding a central space together with almost continuous vacuum space heat insulation.

8. In a vacuum wall receptacle, an open top chamber surrounded by a hollow space having opposed walls and an open edge, bracing means between said walls, a pair of spaced opposed frames, one arranged within and spaced from the outer, each of said frames seating upon an edge of a wall at said open edge, each of said frames extending from one wall towards the other, and means anchored in, seated on one face of said frames and extending across the space between the frames for closing said space.

9. In a vacuum wall receptacle, means to provide an open top chamber surrounded by a vacuum space having opposed walls and sealing means at its edge, said sealing means comprising a closing element resting upon a continuous grooved support each of said supports attached to the edge of one of said opposed walls, a continuous space between said grooved supports, the central part of said closing element closing said space and the side parts extending into a deep groove in each of said supports, the edges of said side parts being continually immersed in a liquid seal in the bottom of said grooves, a cover in each of said grooves for each of said sealing means, a cover for said open top chamber of like construction and form but shorter in height, the wall edges of said cover abutting the wall edges of said open top chamber and providing vacuum wall heat insulation substantially surrounding an enclosed space on the top, sides and bottom.

10. In a vacuum wall receptacle, means to provide an open top chamber surrounded by a vacuum space having opposed walls and sealing means at its edge, a plurality of holes through one of said opposed walls for the passage of bracing members, a plurality of threaded sleeves, each of said threaded sleeves having an expanded base fitting the inner face of said wall, the hollow in each of said sleeves forming a continuation of each of said holes through said wall, said threaded sleeves projecting into said vacuum space for the adjustable attachment of said bracing members, a cover for said open top chamber of like means and construction but less in height, the vacuum space in said cover wall forming a continuation of the vacuum wall surrounding said open top chamber providing substantially continuous vacuum wall heat insulation surrounding an enclosed space.

11. In a vacuum wall receptacle, a structure including a vacuum space having opposed walls and forming a vacuum wall, means in said structure for maintaining said opposed walls in a rigid spaced relation to each other, flanges attached to the edges of said opposed walls, said flanges extending toward the center and providing a continuous narrow space between said flanges, a hollow space arranged in each of said flanges, said hollow spaces extending continuously on each side of said narrow space between said flanges, a thin sealing strip of low heat conductivity mounted upon said flanges, the central part of said sealing strip closing said narrow space and the side parts extending into said hollow spaces in said flanges, a liquid sealing element arranged within said hollow spaces, covers of solid sealing material completing an enclosure for said liquid sealing element in each of said hollow spaces, a means for the passage of air from said vacuum space between said opposed walls through one of said walls into a vacuum pump connection and a substantially perfect vacuum in said vacuum space.

12. In a vacuum wall receptacle, a structure including a vacuum space having opposed walls, said vacuum space being sealed at its edge, means in said structure for maintaining said opposed walls in a rigid spaced relation to each other, a plurality of threaded sleeves based upon the inner face of one of said opposed walls, said threaded sleeves projecting in the said vacuum space, the hollow passages in said sleeves forming continuations of a plurality of holes in the wall upon the inner face of which said sleeves are based, a plurality of bracing elements threaded at their heads to said threaded sleeves, said bracing elements extending across said vacuum space and making accurate contact with the other of said opposed walls, a close fitting envelope of material impenetrable to air covering said sealed edge of said vacuum wall, said envelope being continuous around said vacuum wall structure and enclosing said structure, means for the passage of air from said vacuum space through one of said opposed walls into a vacuum pump connection and a substantially perfect vacuum in said vacuum space.

13. In a vacuum wall receptacle a structure including a vacuum space having opposed walls and forming a vacuum wall, means in said structure for maintaining said opposed walls in a rigid spaced relation to each other, flanges extending from the edges of said opposed walls toward the center providing a continuous narrow space between said flanges, a strip of very thin material mounted upon said flanges, the central part of said strip completing said vacuum wall at its edge and forming an edge heat insulation, a plurality of threaded sleeves based upon the inner face of one of said opposed walls, said sleeves projecting into said vacuum space, bracing members threaded at their heads to said threaded sleeves, said bracing members extending across said vacuum space and making pressure contact with the other of said opposed walls, a close fitting envelope of material impenetrable to air covering said flanges and a strip mounted on said flanges, said envelope surrounding and enclosing said vacuum wall structure, means for the passage of air from said vacuum space through one of said opposed walls into a vacuum pump connection and a substantially complete vacuum in said vacuum space.

14. In a vacuum wall receptacle, a structure including a vacuum space having opposed walls, means in said structure for maintaining said opposed walls in a rigid spaced relation to each other, flanges extending from the edges of said opposed walls toward the center providing a continuous narrow space between said flanges, a strip of very thin material mounted upon said flanges, the central part of said strip closing said vacuum space, a plurality of threaded sleeves based upon the inner face of one of said walls, said threaded sleeves having expanded bases, said expanded bases fitting said inner face of said wall, said threaded sleeves projecting into said vacuum space, a plurality of bracing members threaded to said threaded sleeve, said bracing members extending across said vacuum space and making pressure contact to the other of said opposed walls, a heat insulating body arranged in said vacuum space, a pipe for the passage of air through one of said opposed walls into a vacuum pump connection and a substantially complete vacuum in said vacuum space.

15. In a vacuum wall receptacle, a structure including a vacuum space having opposed walls, means in said structure for maintaining said opposed walls in a rigid spaced relation to each other, sealing means for the edges of said opposed walls, bracing means within said vacuum structure, a plurality of sheets spaced from each other arranged in said vacuum space, said sheets extending approximately the length and breadth of said space, the inner sides of said sheets having a dull black surface, means for the passage of air through one of said opposed walls into a vacuum pump connection and a substantially complete vacuum in said vacuum space.

WILLIAM C. O'LEARY.